US005227460A

United States Patent [19]

Mahabadi et al.

[11] Patent Number: 5,227,460

[45] Date of Patent: Jul. 13, 1993

[54] CROSS-LINKED TONER RESINS

[75] Inventors: Hadi K. Mahabadi, Etobicoke; Enno E. Agur, Toronto; Gerald R. Allison, Oakville; Michael S. Hawkins, Mississauga; Stephan Drappel, Toronto; Maria N. V. McDougall, Burlington, all of Canada; Bernard Grushkin, Pittsford, N.Y.; Thomas R. Hoffend, Webster, N.Y.; Angelo J. Barbetta, Penfield, N.Y.

[73] Assignee: Xerox Corporation, Stamford, Conn.

[21] Appl. No.: 814,782

[22] Filed: Dec. 30, 1991

[51] Int. Cl.[5] .............................................. C08G 63/20

[52] U.S. Cl. .................................... 528/272; 528/296; 528/297; 528/300; 528/301; 528/303; 528/306; 528/308; 528/308.6; 528/480; 528/491; 528/503; 525/437; 430/109; 430/137; 522/3; 522/6; 522/60; 522/101; 522/104

[58] Field of Search ............... 528/480, 491, 503, 272, 528/296, 297, 300, 301, 303, 306, 308, 308.6; 525/437; 430/109, 137; 522/3, 6, 60, 101, 104; 264/13

[56] References Cited

U.S. PATENT DOCUMENTS

| | | | |
|---|---|---|---|
| Re. 31,072 | 11/1982 | Jadwin et al. | 430/99 |
| 3,590,000 | 6/1971 | Palermiti et al. | 430/110 |
| 3,681,106 | 8/1972 | Burns et al. | 430/120 |
| 3,843,757 | 10/1974 | Ehrenfreund et al. | 264/53 |
| 3,847,604 | 11/1974 | Hagenbach et al. | 96/1 |
| 3,876,736 | 4/1975 | Takiura | 264/40 |
| 3,941,898 | 3/1976 | Sadamatsu et al. | 427/18 |
| 4,089,917 | 5/1978 | Takiura et al. | 264/40.3 |
| 4,135,833 | 8/1979 | Matsunaga et al. | 430/110 |
| 4,298,672 | 11/1981 | Lu | 430/108 |
| 4,338,390 | 7/1982 | Lu | 430/106 |
| 4,513,074 | 4/1985 | Nash et al. | 430/106.6 |
| 4,533,614 | 8/1985 | Fukumoto et al. | 430/99 |
| 4,556,624 | 12/1985 | Gruber et al. | 430/110 |
| 4,565,763 | 1/1986 | Uchiyama et al. | 430/109 |
| 4,604,338 | 8/1986 | Gruber et al. | 430/106 |
| 4,797,339 | 1/1989 | Maruyama et al. | 430/109 |
| 4,824,750 | 4/1989 | Mahalek et al. | 430/99 |
| 4,894,308 | 1/1990 | Mahabadi et al. | 430/137 |
| 4,935,326 | 6/1990 | Creatura et al. | 430/108 |
| 4,937,166 | 6/1990 | Creatura et al. | 430/88 |
| 4,939,060 | 7/1990 | Tomiyama et al. | 430/106.6 |
| 4,973,439 | 11/1990 | Chang et al. | 264/101 |
| 4,990,293 | 2/1991 | Macosko et al. | 264/40.1 |
| 5,057,392 | 10/1991 | McCabe et al. | 430/109 |
| 5,147,747 | 9/1992 | Wilson et al. | 430/109 |
| 5,156,937 | 10/1992 | Alexandrovich et al. | 430/110 |

FOREIGN PATENT DOCUMENTS

| | | |
|---|---|---|
| 55-166651 | 12/1980 | Japan . |
| 56-94362 | 7/1981 | Japan . |
| 56-116041 | 9/1981 | Japan . |

*Primary Examiner*—Samuel A. Acquah
*Attorney, Agent, or Firm*—Oliff & Berridge

[57] ABSTRACT

A low melt toner resin with low minimum fix temperature and wide fusing latitude contains a linear portion and a cross-linked portion containing high density cross-linked microgel particles, but substantially no low density cross-linked polymer. The resin may be formed by reactive melt mixing.

31 Claims, 2 Drawing Sheets

CROSS-LINKED TONER RESINS

The present invention is generally directed to toner resins and toners. More specifically, the present invention relates to partially cross-linked resins that can be selected for the preparation of heat fixable toners with, for example, excellent low temperature fixing characteristics and superior offset properties in a hot roll fixing system, and with excellent vinyl offset properties.

BACKGROUND

A need exists for toners which melt at lower temperatures than a number of toners now commercially used with certain copying and printing machines. Temperatures of approximately 160°-200° C. are often selected to fix toner to a support medium such as a sheet of paper or transparency to create a developed image. Such high temperatures may reduce or minimize the life of certain fuser rolls such as those made of silicone rubbers or fluoroelastomers (e.g., Viton®), may limit fixing speeds, may necessitate larger amounts of power to be consumed during operation of a copier or printer such as a xerographic copier which employs a method of fixing such as, for example, hot roll fixing.

Toner utilized in development in the electrographic process is generally prepared by mixing and dispersing a colorant and a charge enhancing additive into a thermoplastic binder resin, followed by micropulverization. As the thermoplastic binder resin, several polymers are known including polystyrenes, styrene-acrylic resins, styrene-methacrylic resins, polyesters, epoxy resins, acrylics, urethanes and copolymers thereof. As the colorant, carbon black is utilized often, and as the charge enhancing additive, alkyl pyridinium halides, distearyl dimethyl ammonium methyl sulphate, and the like are known.

Toner can be fixed to a support medium such as a sheet of paper or transparency by different fixing methods. A fixing system which is very advantageous in heat transfer efficiency and is especially suited for high speed electrophotographic processes is hot roll fixing. In this method, the support medium carrying a toner image is transported between a heated fuser roll and a pressure roll, with the image face contacting the fuser roll. Upon contact with the heated fuser roll, the toner melts and adheres to the support medium forming a fixed image.

Fixing performance of the toner can be characterized as a function of temperature. The lowest temperature at which the toner adheres to the support medium is called Cold Offset Temperature (COT), and the maximum temperature at which the toner does not adhere to the fuser roll is called the Hot Offset Temperature (HOT). When the fuser temperature exceeds HOT, some of the molten toner adheres to the fuser roll during fixing and is transferred to subsequent substrates containing developed images, resulting for example in blurred images. This undesirable phenomenon is called offsetting. Between the COT and HOT of the toner is the Minimum Fix Temperature (MFT) which is the minimum temperature at which acceptable adhesion of the toner to the support medium occurs, that is, as determined by for example a creasing test. The difference between MFT and HOT is called the Fusing Latitude.

The hot roll fixing system described above and a number of toners presently used therein exhibit several problems. First, the binder resins in the toners can require a relatively high temperature in order to be affixed to the support medium. This may result in high power consumption, low fixing speeds, and reduced life of the fuser roll and fuser roll bearings. Second, offsetting can be a problem. Third, toners containing vinyl type binder resins such as styrene-acrylic resins may have an additional problem which is known as vinyl offset. Vinyl offset occurs when a sheet of paper or transparency with a fixed toner image comes in contact for a period of time with a polyvinyl chloride (PVC) surface containing a plasticizer used in making the vinyl material flexible such as for example in vinyl binder covers, and the fixed image adheres to the PVC surface.

There is a need for a toner resin which has low fix temperature and high offset temperature (or wide fusing latitude), and superior vinyl offset property, and processes for the preparation of such a resin. Toners which operate at lower temperatures would reduce the power needed for operation and increase the life of the fuser roll and the high temperature fuser roll bearings. Additionally, such low melt toners (i.e., toners having a MFT lower than 200° C., preferably lower than 160° C.) would reduce the volatilization of release oil such as silicon oil which may occur during high temperature operation and which can cause problems when the volatilized oil condenses in other areas of the machine. In particular, toners with a wide fusing latitude and with good toner particle elasticity are needed. Such toners with wide fusing latitude can provide flexibility in the amount of oil needed as release agent and can minimize copy quality deterioration related to the toner offsetting to the fuser roll.

In order to lower the minimum fix temperature of the binder resin, in some instances the molecular weight of the resin may be lowered. Low molecular weight and amorphous polyester resins and epoxy resins have been used for low temperature fixing toners. For example, attempts to use polyester resins as a binder for toner are disclosed in U.S. Pat. No. 3,590,000 to Palermiti et al. and U.S. Pat. No. 3,681,106 to Burns et al. The minimum fixing temperature of polyester binder resins can be lower than that of other materials, such as styrene-acrylic and styrene-methacrylic resins. However, this may lead to a lowering of the hot offset temperature, and as a result, decreased offset resistance. In addition, the glass transition temperature of the resin may be decreased, which may cause the undesirable phenomenon of blocking of the toner during storage.

To prevent fuser roll offsetting and to increase fuser latitude of toners, various modifications have been made in toner composition. For example waxes, such as low molecular weight polyethylene, polypropylene, etc., have been added to toners to increase the release properties, as disclosed in U.S. Pat. No. 4,513,074 to Nash et al., the entire disclosure of which is hereby totally incorporated by reference herein. However, to prevent offset sufficiently, considerable amounts of such materials may be required in some instances, resulting in detrimental effects such as the tendency to toner agglomeration, worsening of free flow properties and destabilization of charging properties.

Modification of binder resin structure, for example by branching, cross-linking, etc., when using conventional polymerization reactions may also improve offset resistance. In U.S. Pat. No. 3,681,106 to Burns et al., for example, a polyester resin was improved with respect to offset resistance by non-linearly modifying the polymer backbone by mixing a trivalent or more polyol or polyacid with the monomer to generate branching during polycondensation. However, an increase in degree of branching may result in an elevation of the minimum fix temperature. Thus, any initial advantage of low temperature fix may be diminished.

Another method of improving offset resistance is to utilize cross-linked resin in the binder resin. For example, U.S. Pat. No. 3,941,898 to Sadamatsu et al. discloses a toner in which a cross-linked vinyl type polymer is used as the binder resin. Similar disclosures for vinyl type resins are made in U.S. Pat. Nos. Re. 31,072 (a reissue of 3,938,992) to Jadwin et al., 4,556,624 to Gruber et al., 4,604,338 to Gruber et al. and 4,824,750 to Mahalek et al.

While significant improvements can be obtained in offset resistance and entanglement resistance, a major drawback may ensue in that with cross-linked resins prepared by conventional polymerization (that is, cross-linking during polymerization using a cross-linking agent), there exist three types of polymer configurations: a linear and soluble portion called the linear portion, a portion comprising highly cross-linked gel particles which is not soluble in substantially any solvent, e.g., tetrahydrofuran, toluene and the like, and is called gel, and a cross-linked portion which is low in cross-linking density and therefore is soluble in some solvents, e.g., tetrahydrofuran, toluene and the like, and is called sol. The presence of highly cross-linked gel in the binder resin increases the hot offset temperature, but at the same time the low cross-link density portion or sol increases the minimum fix temperature. An increase in the amount of cross-linking in these types of resins results in an increase not only of the gel content, but also of the amount of sol or soluble cross-linked polymer with low degree of cross-linking in the mixture. This results in an elevation of the minimum fix temperature, and as a consequence, in a reduction or reduced increase of the fusing latitude. Also, a drawback of embodiments of cross-linked polymers prepared by conventional polymerization is that as the degree of cross-linking increases, the gel particles or very highly cross-linked insoluble polymer with high molecular weight grow larger. The large gel particles can be more difficult to disperse pigment in, causing the formation of unpigmented toner particles during pulverization, and toner developability may thus be hindered. Also, compatibility with other binder resins may be relatively poor and toners containing vinyl polymers often show vinyl offset.

Cross-linked polyester binder resins prepared by conventional polycondensation reactions have been made for improving offset resistance, such as for example in U.S. Pat. No. 3,681,106 to Burns et al. As with cross-linked vinyl resins, increased cross-linking as obtained in such conventional polycondensation reactions may cause the minimum fix temperature to increase. When cross-linking is carried out during polycondensation using tri- or polyfunctional monomers as cross-linking agents with the polycondensation monomers, the net effect is that apart from making highly cross-linked high molecular weight gel particles which are not soluble in substantially any solvent, the molecular weight distribution of the soluble part widens due to the formation of sol or cross-linked polymer with a very low degree of cross-linking, which is soluble in some solvents. These intermediate high molecular weight species may result in an increase in the melt viscosity of the resin at low and high temperature, which can cause the minimum fix temperature to increase. Furthermore, gel particles formed in the polycondensation reaction which is carried out using conventional polycondensation in a reactor with low shear mixing can grow rapidly with increase in degree of cross-linking. As in the case of cross-linked vinyl polymers using conventional polymerization reactions, these large gel particles may be more difficult to disperse pigment in, resulting in unpigmented toner particles after pulverization, and thus hindering developability.

U.S. Pat. No. 4,533,614 to Fukumoto et al. discloses a loosened cross-linked polyester binder resin which shows low temperature fix and good offset resistance. Metal compounds were used as cross-linking agents. Similar disclosures are presented in U.S. Pat. No. 3,681,106 and Japanese Laid-Open Patent Applications Nos. 94362/1981, 116041/1981 and 166651/1980. As discussed in the '614 patent, incorporation of metal complexes, however, can influence unfavorably the charging properties of the toner. Also, in the case of color toners other than black (e.g., cyan), metal complexes can adversely affect the color of pigments. It is also known that metal containing toner can have disposal problems in some geographical areas, such as for example in the State of California, U.S.A. Metal complexes are often also expensive materials.

Many processes are known for effecting polymerization reactions, including reactive extrusion processes, for both initial polymerization reactions employing monomers or prepolymers, and for polymer modification reactions, such as graft, coupling, cross-linking and degradation reactions. However, it is believed that the prior art does not disclose the use of a reactive extrusion process to prepare cross-linked resins for use in toners.

U.S. Pat. No. 4,894,308 to Mahabadi et al. and U.S. Pat. No. 4,973,439 to Chang et al., for example, disclose extrusion processes for preparing electrophotographic toner compositions in which pigment and charge control additive were dispersed into the binder resin in the extruder. However, in each of these patents, there is no suggestion of a chemical reaction occurring during extrusion.

An injection molding process for producing cross-linked synthetic resin molded articles is disclosed in U.S. Pat. No. 3,876,736 to Takiura in which polyolefin or polyvinyl chloride resin and cross-linked agent were mixed in an extruder, and then introduced into an externally heated reaction chamber outside the extruder wherein the cross-linking reaction occurred at increased temperature and pressure, and at low or zero shear.

In U.S. Pat. No. 4,089,917 to Takiura et al., an injection molding and cross-linking process is disclosed in which polyethylene resin and cross-linking agent were mixed in an extruder and reacted in reaction chambers at elevated temperature and pressure. Heating of the resin mixture occurred partially by high shear in inlet flow orifices. However, the cross-linking reaction in this process still took place in the reaction chambers at low or zero shear, and the final product is a thermoset molded part, and thus is not useful for toner resins.

A process for dispensing premixed reactive precursor polymer mixtures through a die for the purposes of reaction injection molding or coating is described in U.S. Pat. No. 4,990,293 to Macosko et al. in which polyurethane precursor systems were cross-linked in the die and not in the extruder. The dimensions of the die channel were determined such that the value of the wall shear stress was greater than a critical value in order to prevent gel buildup and consequent plugging of the die. The final product is a thermoset molded part, and thus is not useful for toner resins.

It should be noted that the processes disclosed in U.S. Pat. Nos. 3,876,736, 4,089,917 and 4,990,293 are not reactive extrusion processes, because the cross-linking in each case occurs in a die or a mold, and not in an extruder, and the cross-linking takes place at low or zero shear. These processes are for producing engineering plastics such as thermoset materials which cannot be remelted once molded, and thus are not suitable for toner application.

SUMMARY OF THE INVENTION

Embodiments of the present invention overcome the above-discussed problems in the prior art. The present invention provides a thermoplastic resin for toner which can be sufficiently fixed at low temperatures (e.g., below 200° C., preferably below 160° C.) by hot roll fixing. Thus, less heat or other source of energy is needed for fixing than for higher fix temperature toner resins, and therefore, less power is consumed during operation of a copier or printer. The undesirable paper curl phenomenon may also be reduced, or higher speed of copying and printing may be enabled. Also, toner prepared from the resin of the invention has excellent offset resistance, wide fusing latitude and good rheological properties, is inexpensive, safe and economical, and shows minimized or substantially no vinyl offset.

The toner resin of the invention comprises cross-linked portions and linear portions. The cross-linked portions comprise very high molecular weight densely cross-linked gel particles having average diameter less than about 0.1 microns and insoluble in substantially any solvent, including tetrahydrofuran, toluene and the like. The linear portion comprises low molecular weight resin soluble in various solvents such as for example tetrahydrofuran, toluene and the like. The high molecular weight highly cross-linked gel particles are substantially uniformly distributed in the linear portions. Substantially no portion of the resin comprises sol or low density cross-linked polymer, such as that which would be obtained in conventional cross-linking processes such as polycondensation, bulk, solution, suspension, emulsion and dispersion polymerization processes.

The toner resin of the invention may be fabricated by a reactive melt mixing process. In this process, a reactive base resin, preferably unsaturated polyester resin, is partially cross-linked at high temperature and under high shear, preferably by using chemical initiators.

DETAILED DESCRIPTION OF PREFERRED EMBODIMENTS

Figure 1:
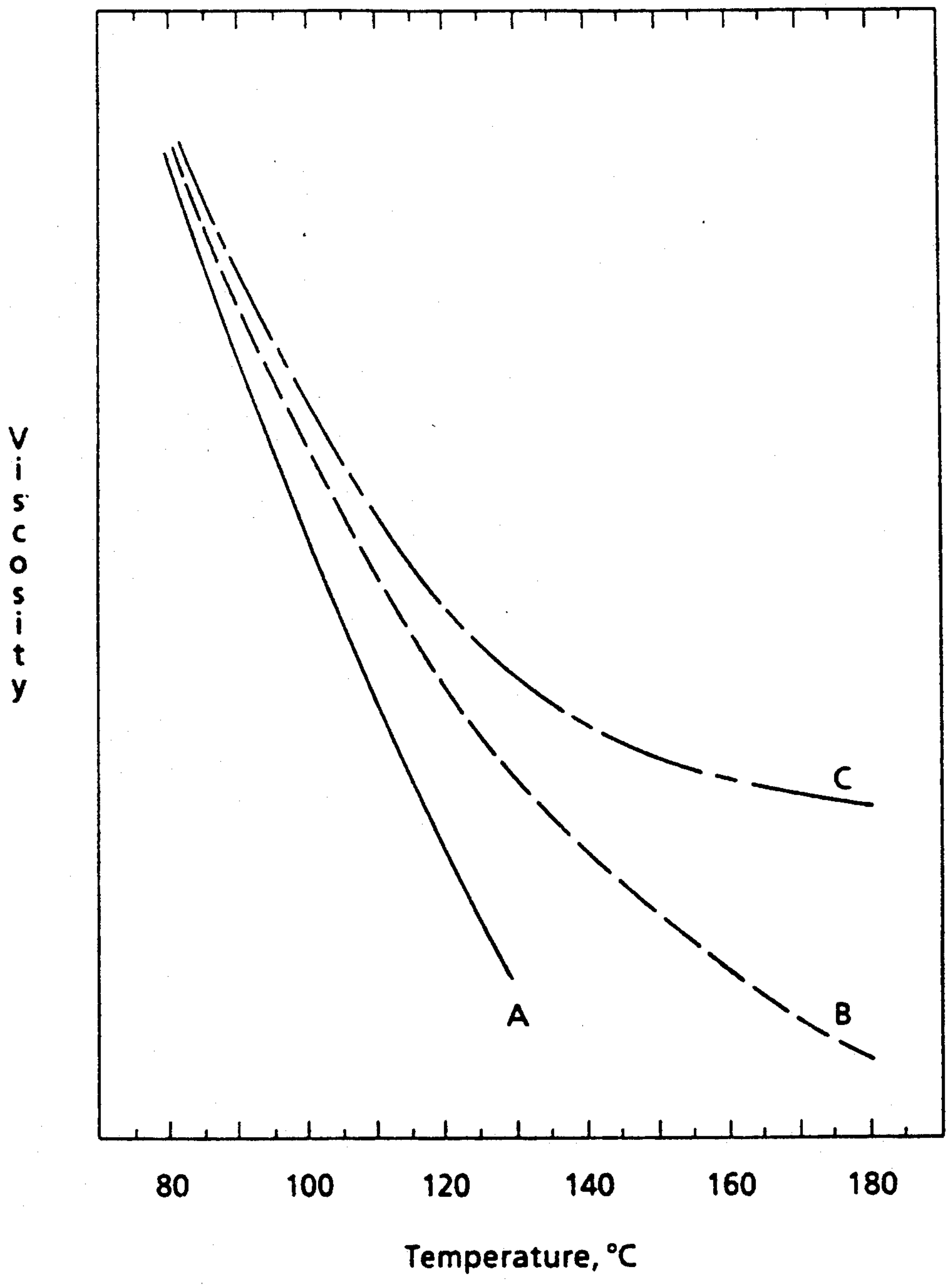
FIG. 1 depicts the effect of temperature on melt viscosity of various toner resins. Viscosity curve A is for a linear unsaturated polyester low fix temperature resin with very low fusing latitude (thus, not suitable for hot roll fusing). Viscosity curves B and C are for cross-linked polyester low fix temperature resins of the present invention with good fusing latitude. The resin of curve C has a higher gel content than that of curve B.

There is a need for a cross-linked resin which only contains a highly cross-linked portion in the form of microgels distributed throughout the linear portion, and in which the size of the gel particles does not grow with increasing degree of cross-linking. Furthermore, there is a need for an effective process for producing such a resin. The present invention provides such a resin which can be prepared by a reactive melt mixing process.

The present invention provides a low fix temperature toner resin, and specifically a low fix temperature toner resin based on cross-linked resin comprised of cross-linked and linear portions, the cross-linked portion consisting essentially of microgel particles with an average volume particle diameter up to 0.1 micron, preferably about 0.005 to about 0.1 micron, said microgel particles being substantially uniformly distributed throughout the linear portions. This resin may be prepared by a reactive melt mixing process, including a process disclosed in detail in copending application Ser. No. 07/814,641 filed simultaneously herewith and entitled "Reactive Melt Mixing Process for Preparing Cross-Linked Toner Resin", the disclosure of which is hereby totally incorporated herein by reference. In this resin the cross-linked portion consists essentially of microgel particles, preferably up to about 0.1 micron in average volume particle diameter as determined by scanning electron microscopy and transmission electron microscopy. When produced by a reactive melt mixing process wherein the cross-linking occurs at high temperature and under high shear, the size of the microgel particles does not continue to grow with increasing degree of cross-linking. Also, the microgel particles are distributed substantially uniformly throughout the linear portion.

The cross-linked portions or microgel particles are prepared in such a way that there is substantially no distance between the polymer chains. Thus the cross-linking is preferably not accomplished via monomer or polymer bridges. The polymer chains are directly connected, for example at unsaturation sites or other reactive sites, or in some cases by a single intervening atom such as, for example, oxygen. Therefore, the cross-linked portions are very dense and do not swell as much as gel produced by conventional cross-linking methods. This cross-link structure is different from conventional cross-linking in which the cross-link distance between chains is quite large with several monomer units, and where the gels swell very well in a solvent such as tetrahydrofuran or toluene. These highly cross-linked dense microgel particles distributed throughout the linear portion impart elasticity to the resin which improves the resin offset properties, while not substantially affecting the resin minimum fix temperature.

The present invention provides a new type of toner resin which is preferably a partially cross-linked unsaturated resin such as unsaturated polyester prepared by cross-linking a linear unsaturated resin (hereinafter called base resin) such as linear unsaturated polyester resin preferably with a chemical initiator in a melt mixing device such as, for example, an extruder at high temperature (e.g., above the melting temperature of the resin and preferably up to about 150° C. above that melting temperature) and under high shear. In preferred embodiments, the base resin has a degree of unsaturation of about 0.1 to about 30 mole percent, preferably about 5 to about 25 mole percent. The shear levels should be sufficient to inhibit microgel growth above about 0.1 micron average particle diameter and to ensure substantially uniform distribution of the microgel particles. Such shear levels are readily available in melt mixing devices such as extruders.

The toner resin of this invention has a weight fraction of the microgel (gel content) in the resin mixture in the range typically from about 0.001 to about 50 weight percent, preferably about 0.1 to about 40 or 10 to 19 weight percent. The linear portion is comprised of base resin, preferably unsaturated polyester, in the range from about 50 to about 99.999 percent by weight of said toner resin, and preferably in the range from about 60 to about 99.9 or 81 to 90 percent by weight of said toner resin. The linear portion of the resin preferably consists essentially of low molecular weight reactive base resin which did not cross-link during the cross-linking reaction, preferably unsaturated polyester resin.

According to embodiments of the invention, the number-average molecular weight ($M_n$) of the linear portion as measured by gel permeation chromatography (GPC) is in the range typically from about 1,000 to about 20,000, and preferably from about 2,000 to about 5,000. The weight-average molecular weight ($M_w$) of the linear portion is in the range typically from about 2,000 to about 40,000, and preferably from about 4,000 to about 15,000. The molecular weight distribution ($M_w/M_n$) of the linear portion is in the range typically from about 1.5 to about 6, and preferably from about 2 to about 4. The onset glass transition temperature ($T_g$) of the linear portion as measured by differential scanning calorimetry (DSC) for preferred embodiments is in the range typically from about 50° C. to about 70° C., and preferably from about 51° C. to about 60° C. Melt viscosity of the linear portion of preferred embodiments as measured with a mechanical spectrometer at 10 radians per second is from about 5,000 to about 200,000 poise, and preferably from about 20,000 to about 100,000 poise, at 100° C. and drops sharply with increasing temperature to from about 100 to about 5000 poise, and preferably from about 400 to about 2,000 poise, as temperature rises from 100° C. to 130° C.

The toner resin contains a mixture of cross-linked resin microgel particles and a linear portion as illustrated herein. In embodiments of the toner resin of the invention, the onset $T_g$ is in the range typically from about 50° C. to about 70° C., and preferably from about 51° C., to about 60° C., and the melt viscosity as measured with a mechanical spectrometer at 10 radians per second is from about 5,000 to about 200,000 poise, and preferably from about 20,000 to about 100,000 poise, at 100° C. and from about 10 to about 20,000 poise at 160° C.

The low fix temperature of the toner resin of this invention is a function of the molecular weight and molecular weight distribution of the linear portion, and is not affected by the amount of microgel particles or degree of cross-linking. This is portrayed by the proximity of the viscosity curves of FIG. 1 at low temperature (such as, for example, at 100° C.) in which the melt viscosity is in the range from about 20,000 to about 100,000 poise as measured with a mechanical spectrometer at 10 radians per second. The hot offset temperature is increased with the presence of microgel particles which impart elasticity to the resin. With a higher degree of cross-linking or microgel content, the hot offset temperature increases. This is reflected in divergence of the viscosity curves at high temperature (such as, for example, at 160° C.) in which the melt viscosity is typically in the range from about 10 to about 20,000 poise as measured at 10 radians per second depending on the amount of microgel particles in the resin.

The toner resin of the present invention can provide a low melt toner with a minimum fix temperature of from about 100° C. to about 200° C., preferably about 100° C. to about 160° C., more preferably about 110° C. to about 140° C., provide the low melt toner with a wide fusing latitude to minimize or prevent offset of the toner onto the fuser roll, and maintain high toner pulverization efficiencies. The low melt toner resin preferably has a fusing latitude greater than 10° C., preferably from about 10° C. to about 120° C., and more preferably more than about 20° C. and even more preferably more than about 30° C. The MFT of the toner is not believed to be sensitive to the cross-linking in the microgel particles of the toner resin, while the fusing latitude increases significantly as a function of the cross-linking or content of microgels in the toner resin. Thus, it is possible to produce a series of toner resins and thus toners with the same MFT, but with different fusing latitudes. Toner resins and thus toners of the present invention show minimized or substantially no vinyl offset.

Figure 2:
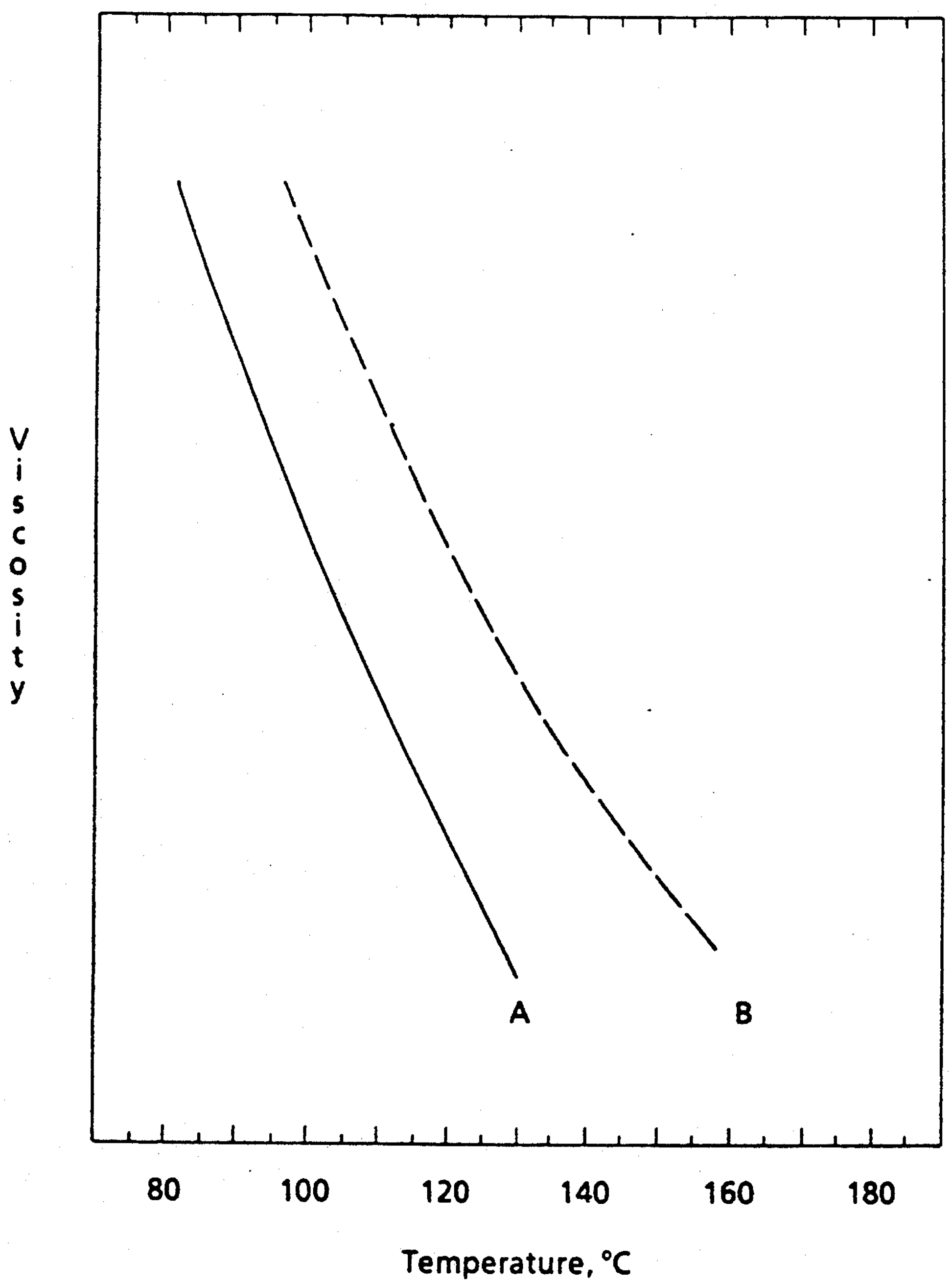
FIG. 2 depicts the effect of cross-linking on the melt viscosity of resins for toner prepared by the conventional cross-linking approach. Viscosity curve A is for a linear unsaturated polyester low fix temperature resin with very low fusing latitude (thus, not suitable for hot roll fusing). Viscosity curve B is for an unsaturated polyester resin cross-linked by conventional methods which has good fusing latitude but also a high fix temperature.

As the degree of cross-linking or microgel content increases, the low temperature melt viscosity does not change appreciably, while the high temperature melt viscosity goes up. In an exemplary embodiment, the hot offset temperature can increase approximately 30%. This can be achieved by cross-linking in the melt state at high temperature and high shear such as, for example, by cross-linking an unsaturated polyester using a chemical initiator in an extruder resulting in the formation of microgel alone, distributed substantially uniformly throughout the linear portion, and substantially no intermediates or sol portions which are cross-linked polymers with low cross-linking density. When cross-linked intermediate polymers are generated by conventional polymerization processes, the viscosity curves generally shift in parallel from low to high degree of cross-linking as shown in FIG. 2. This is reflected in increased hot offset temperature, but also increased minimum fix temperature.

In a preferred embodiment, the cross-linked portion consists essentially of very high molecular weight microgel particles with high density cross-linking (as measured by gel content) and which are not soluble in substantially any solvents such as, for example, tetrahydrofuran, toluene and the like. As discussed above, the microgel particles are highly cross-linked polymers with a very small, if any, cross-link distance. This type of cross-linked polymer may be formed by reacting chemical initiator with linear unsaturated polymer, and more preferably linear unsaturated polyester, at high temperature and under high shear. The initiator molecule breaks into radicals and reacts with one or more double bond or other reactive site within the polymer chain forming a polymer radical. This polymer radical reacts with other polymer chains or polymer radicals many times, forming a highly and directly cross-linked microgel. This renders the microgel very dense and results in the microgel not swelling very well in solvent. The dense microgel also imparts elasticity to the resin and increases its hot offset temperature while not affecting its minimum fix temperature.

The weight fraction of the microgel (gel content) in the resin may be defined as follows:

$$\text{Gel Content} = \frac{\text{Total Sample Weight} - \text{Weight of Soluble Polymer}}{\text{Total Sample Weight}} \times 100\%$$

The gel content may be calculated by measuring the relative amounts of linear, soluble polymer and the nonlinear, cross-linked polymer utilizing the following procedure: (1) the sample of the cross-linked resin to be analyzed, in an amount between 145 and 235 mg, is weighted directly into a glass centrifuge tube; (2) 45 ml toluene is added and the sample is put on a shaker for at least 3 hours, preferably overnight; (3) the sample is then centrifuged at about 2500 rpm for 30 minutes and then a 5 ml aliquot is carefully removed and put into a preweighed aluminum dish; (4) the toluene is allowed to air evaporate for about 2 hours, and then the sample is further dried in a convection oven at 60° C. for about 6 hours or to constant weight; (5) the sample remaining, times nine, gives the amount of soluble polymer. Thus, utilizing this quantity in the above Equation, the gel content can be easily calculated.

Linear unsaturated polyesters used as the base resin are low molecular weight condensation polymers which may be formed by the step-wise reactions between both saturated and unsaturated diacids (or anhydrides) and dihydric alcohols (glycols or diols). The resulting unsaturated polyesters are reactive (e.g., cross-linkable) on two fronts: (i) unsaturation sites (double bonds) along the polyester chain, and (ii) functional groups such as carboxyl, hydroxy, etc. groups amenable to acid-base reactions. Typical unsaturated polyester base resins useful for this invention are prepared by melt polycondensation or other polymerization processes using diacids and/or anhydrides and diols. Suitable diacids and dianhydrides include but are not limited to saturated diacids and/or anhydrides such as for example succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like and mixtures thereof; and unsaturated diacids and/or anhydrides such as for example maleic acid, fumaric acid, chloromaleic acid, methacrylic acid, acrylic acid, itaconic acid, citraconic acid, mesaconic acid, maleic anhydride, and the like and mixtures thereof. Suitable diols include but are not limited to for example propylene glycol, ethylene glycol, diethylene glycol, neopentyl glycol, dipropylene glycol, dibromoneopentyl glycol, propoxylated bisphenol A, 2,2,4-trimethylpentane-1,3-diol, tetrabromo bisphenol dipropoxy ether, 1,4-butanediol, and the like and mixtures thereof, soluble in good solvents such as, for example, tetrahydrofuran, toluene and the like.

Preferred unsaturated polyester base resins are prepared from diacids and/or anhydrides such as, for example, maleic anhydride, fumaric acid, and the like and mixtures thereof, and diols such as, for example, propoxylated bisphenol A, propylene glycol, and the like and mixtures thereof. A particularly preferred polyester is poly(propoxylated bisphenol A fumarate).

Substantially any suitable unsaturated polyester can be used to make the toner resins of the invention; including unsaturated polyesters known for use in toner resins and including unsaturated polyesters whose properties previously made them undesirable or unsuitable for use as toner resins (but which adverse properties are eliminated or reduced by preparing them in the partially cross-linked form of the present invention).

The cross-linking which occurs in the process of the invention is characterized by at least one reactive site (e.g., one unsaturation) within a polymer chain reacting substantially directly (e.g., with no intervening monomer(s)) with at least one reactive site within a second polymer chain, and by this reaction occurring repeatedly to form a series of cross-linked units. This polymer cross-linking reaction may occur by a number of mechanisms. Without intending to be bound by theory, it is believed that the cross-linking may occur through one or more of the following mechanisms:

For example, when an exemplary propoxylated bisphenol A fumarate unsaturated polymer undergoes a cross-linking reaction with a chemical cross-linking initiator, such as, for example, benzoyl peroxide, free radicals produced by the chemical initiator may attack an unsaturation site on the polymer in the following manner:

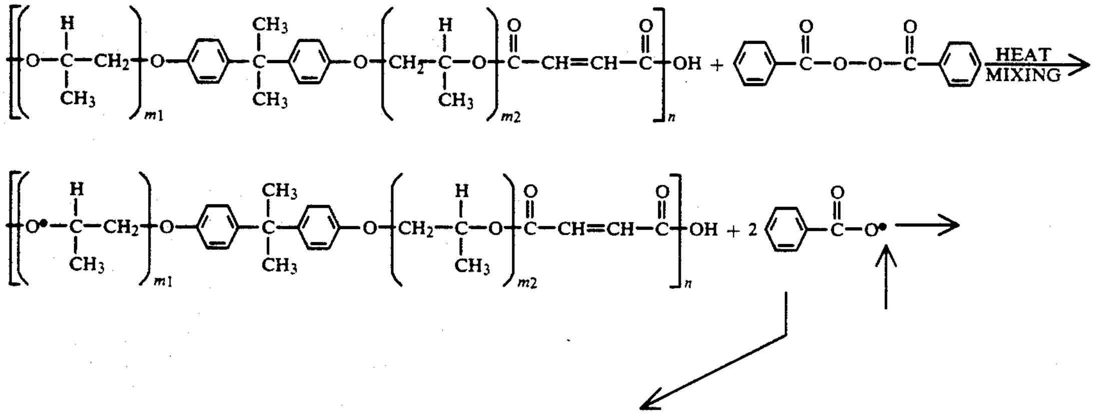

-continued

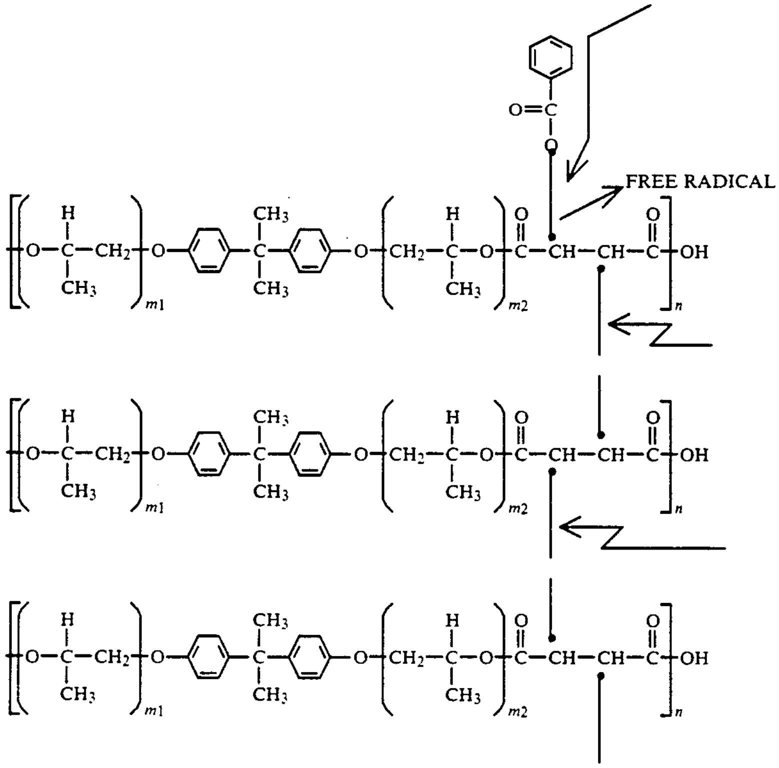

This manner of cross-linking between chains will produce a large, high molecular weight molecule, ultimately forming a gel. (In preferred embodiments of this exemplary polyester, $m_1$ and $m_2$ are at least 1 and the sum of $m_1$ and $m_2$ is not greater than 3, or $m_1$ and $m_2$ are independently 1-3, and n is approximately 8 to 11.)

By a second mechanism, cross-linking may occur between chains of the same exemplary molecule where the free radicals formed from a chemical cross-linking initiator such as benzoic acid attack the carbon of the propoxy group by hydrogen abstraction of a tertiary hydrogen of a benzoyloxy radical in the following manner:

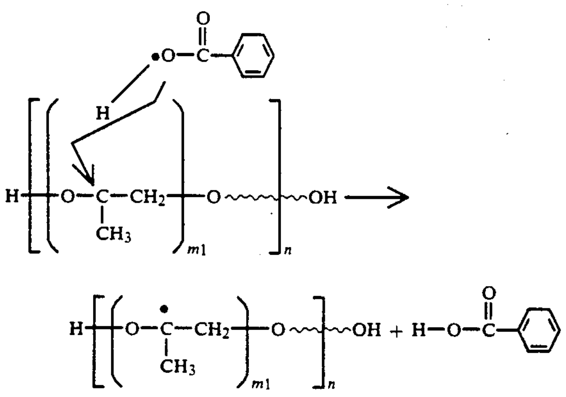

Chemical initiators such as, for example, organic peroxides or azo-compounds are preferred for making the cross-linked toner resins of the invention. Suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl 2,5-di (2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di (benzoyl peroxy) hexane, oo-t-butyl o-(2-ethyl hexyl) mono peroxy carbonate, and oo-t-amyl o-(2-ethyl hexyl) mono peroxy carbonate, alkyl peroxides such as, for example, dicumyl peroxide, 2,5-dimethyl 2,5-di (t-butyl peroxy) hexane, t-butyl cumyl peroxide, α-α-bis(t-butyl peroxy) diisopropyl benzene, di-t-butyl peroxide and 2,5-dimethyl 2,5di (t-butyl peroxy) hexyne-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di (t-butyl peroxy) valerate, 1,1-di (t-butyl peroxy) 3,3,5-trimethyl cyclohexane, 1,1-di (t-butyl peroxy) cyclohexane, 1,1-di (t-amyl peroxy) cyclohexane, 2,2di (t-butyl peroxy) butane, ethyl 3,3-di (t-butyl peroxy) butyrate and ethyl 3,3-di (t-amyl peroxy) butyrate. Suitable azo-compounds include azobis-isobutyronitrile, 2,2'-azobis (isobutyronitrile), 2,2'-azobis (2,4-dimethyl valeronitrile), 2,2'-azobis (methyl butyronitrile), 1,1'-azobis (cyano cyclohexane) and other similar known compounds.

By permitting use of low concentrations of chemical initiator and utilizing all of it in the cross-linking reaction, usually in the range from about 0.01 to about 10 weight percent, and preferably in the range from about 0.1 to about 4 weight percent, the residual contaminants produced in the cross-linking reaction in preferred embodiments can be minimal. Since the cross-linking can be carried out at high temperature, the reaction is very fast (e.g., less than 10 minutes, preferably about 2 seconds to about 5 minutes residence time) and thus little or no unreacted initiator remains in the product.

The low melt toners and toner resins may be prepared by a reactive melt mixing process wherein reactive resins are partially cross-linked. For example, low melt toner resins and toners may be fabricated by a reactive melt mixing process comprising the steps of: (1) melting reactive base resin, thereby forming a polymer melt, in a melt mixing device; (2) initiating cross-linking of the polymer melt, preferably with a chemical cross-linking initiator and increased reaction temperature; (3) keeping the polymer melt in the melt mixing device for a sufficient residence time that partial cross-linking of the base resin may be achieved; (4) providing sufficiently high shear during the cross-linking reaction to keep the gel particles formed during cross-linking small in size and well distributed in the polymer melt; (5) optionally devolatilizing the polymer melt to remove any effluent volatiles. The high temperature reactive melt mixing process allows for very fast cross-linking which enables the production of substantially only microgel particles, and the high shear of the process prevents undue growth of the microgels and enables the microgel particles to be uniformly distributed in the resin.

In a preferred embodiment, the process comprises the steps of: (1) feeding base resin and initiator to an extruder; (2) melting the base resin, thereby forming a polymer melt; (3) mixing the molten base resin and initiator at low temperature to enable good dispersion of the initiator in the base resin before the onset of cross-linking; (4) initiating cross-linking of the base resin with the initiator by raising the melt temperature and controlling it along the extruder channel; (5) keeping the polymer melt in the extruder for a sufficient residence time at a given temperature such that the required amount of cross-linking is achieved; (6) providing sufficiently high shear during the cross-linking reaction thereby keeping the gel particles formed during cross-linking small in size and well distributed in the polymer melt; (7) optionally devolatilizing the melt to remove any effluent volatiles; and (8) pumping the cross-linked resin melt through a die to a pelletizer.

A reactive melt mixing process is a process wherein chemical reactions can be carried out on the polymer in the melt phase in a melt mixing device, such as an extruder. In preparing the toner resins of the invention, these reactions are used to modify the chemical structure and the molecular weight, and thus the melt rheology and fusing properties, of the polymer. Reactive melt mixing is particularly efficient for highly viscous materials, and is advantageous because it requires no solvents, and thus is easily environmentally controlled. It is also advantageous because it permits a high degree of initial mixing of resin and initiator to take place, and provides an environment wherein a controlled high temperature (adjustable along the length of the extruder) is available so that a very quick reaction can occur. It also enables a reaction to take place continuously, and thus the reaction is not limited by the disadvantages of a batch process, wherein the reaction must be repeatedly stopped so that the reaction products may be removed and the apparatus cleaned and prepared for another similar reaction. As soon as the amount of cross-linking desired is achieved, the reaction products can be quickly removed from the reaction chamber.

The resins are generally present in the toner of the invention in an amount of from about 40 to about 98 percent by weight, and more preferably from about 70 to about 98 percent by weight, although they may be present in greater or lesser amounts, provided that the objectives of the invention are achieved. For example, toner resins of the invention can be subsequently melt blended or otherwise mixed with a colorant, charge carrier additives, surfactants, emulsifiers, pigment dispersants, flow additives, and the like. The resultant product can then be pulverized by known methods such as milling to form toner particles. The toner particles preferably have an average volume particle diameter of about 5 to about 25, more preferably about 5 to about 15, microns.

Various suitable colorants can be employed in toners of the invention, including suitable colored pigments, dyes, and mixtures thereof including Carbon Black, such as Regal 330® carbon black (Cabot), Acetylene Black, Lamp Black, Aniline Black, Chrome Yellow, Zinc Yellow, Sicofast Yellow, Luna Yellow, Novaperm Yellow, Chrome Orange, Bayplast Orange, Cadmium Red, Lithol Scarlet, Hostaperm Red, Fanal Pink, Hostaperm Pink, Lithol Red, Rhodamine Lake B, Brilliant Carmine, Heliogen Blue, Hostaperm Blue, Neopan Blue, PV Fast Blue, Cinquassi Green, Hostaperm Green, titanium dioxide, cobalt, nickel, iron powder, Sicopur 4068 FF, and iron oxides such as Mapico Black (Columbia), NP608 and NP604 (Northern Pigment), Bayferrox 8610 (Bayer), MO8699 (Mobay), TMB-100 (Magnox), mixtures thereof and the like.

The colorant, preferably carbon black, cyan, magenta and/or yellow colorant, is incorporated in an amount sufficient to impart the desired color to the toner. In general, pigment or dye is employed in an amount ranging from about 2 to about 60 percent by weight, and preferably from about 2 to about 7 percent by weight for color toner and about 5 to about 60 percent by weight for black toner.

Various known suitable effective positive or negative charge enhancing additives can be selected for incorporation into the toner compositions of the present invention, preferably in an amount of about 0.1 to about 10, more preferably about 1 to about 3, percent by weight. Examples include quaternary ammonium compounds inclusive of alkyl pyridinium halides; alkyl pyridinium compounds, reference U.S. Pat. No. 4,298,672, the disclosure of which is totally incorporated hereby by reference; organic sulfate and sulfonate compositions, U.S. Pat. No. 4,338,390, the disclosure of which is totally incorporated hereby by reference; cetyl pyridinium tetrafluoroborates; distearyl dimethyl ammonium methyl sulfate; aluminum salts such as Bontron E84 TM or E88 TM (Hodogaya Chemical); and the like.

Additionally, other internal and/or external additives may be added in known amounts for their known functions.

The resulting toner particles optionally can be formulated into a developer composition by mixing with carrier particles. Illustrative examples of carrier particles that can be selected for mixing with the toner composition prepared in accordance with the present invention include those particles that are capable of triboelectrically obtaining a charge of opposite polarity to that of the toner particles. Accordingly, in one embodiment the carrier particles may be selected so as to be of a negative polarity in order that the toner particles which are positively charged will adhere to and surround the carrier particles. Illustrative examples of such carrier particles include granular zircon, granular silicon, glass, steel, nickel, iron ferrites, silicon dioxide, and the like. Additionally, there can be selected as carrier particles nickel berry carriers as disclosed in U.S. Pat. No. 3,847,604, the entire disclosure of which is hereby totally incorporated herein by reference, comprised of nodular carrier beads of nickel, characterized by surfaces of reoccurring recesses and protrusions thereby providing particles with a relatively large external area. Other carriers are disclosed in U.S. Pat. Nos. 4,937,166 and 4,935,326, the disclosures of which are hereby totally incorporated herein by reference.

The selected carrier particles can be used with or without a coating, the coating generally being comprised of fluoropolymers, such as polyvinylidene fluoride resins, terpolymers of styrene, methyl methacrylate, a silane, such as triethoxy silane, tetrafluorethylenes, other known coatings and the like.

The diameter of the carrier particles is generally from about 50 microns to about 1,000 microns, preferably about 200 microns, thus allowing these particles to possess sufficient density and inertia to avoid adherence to the electrostatic images during the development process. The carrier particles can be mixed with the toner particles in various suitable combinations. However, best results are obtained when about 1 part carrier to about 10 parts to about 200 parts by weight of toner are mixed.

Toners of the invention can be used in known electrostatographic imaging methods, although the fusing energy requirements of some of those methods can be reduced in view of the advantageous fusing properties of the toner of the invention as discussed herein. Thus for example, the toners or developers of the invention can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll at a temperature lower than 200° C., preferably lower than 160° C., more preferably lower than 140° C., and more preferably about 110° C.

The invention will further be illustrated in the following, nonlimiting examples, it being understood that these examples are intended to be illustrative only and that the invention is not intended to be limited to the materials, conditions, process parameters and the like recited herein. Parts and percentages are by weight unless otherwise indicated.

EXAMPLE I

A cross-linked unsaturated polyester resin is prepared by the reactive extrusion process by melt mixing 99.3 parts of a linear unsaturated polyester with the following structure:

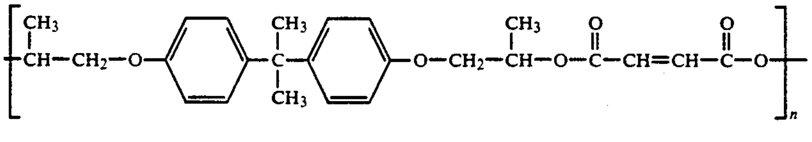

wherein n is the number of repeating units and having $M_n$ of about 4,000, $M_w$ of about 10,300, $M_w/M_n$ of about 2.58 as measured by GPC, onset $T_g$ of about 55° C. as measured by DSC, and melt viscosity of about 29,000 poise at 100° C. and about 750 poise at 130° C. as measured at 10 radians per second, and 0.7 parts benzoyl peroxide initiator as outlined in the following procedure.

The unsaturated polyester resin and benzoyl peroxide initiator are blended in a rotary tumble blender for 30 minutes. The resulting dry mixture is then fed into a Werner & Pfleiderer ZSK-30 twin screw extruder, with a screw diameter of 30.7 mm and a length-to-diameter (L/D) ratio of 37.2, at 10 pounds per hour using a loss-in-weight feeder. The cross-linking is carried out in the extruder using the following process conditions: barrel temperature profile of 70/140/140/140/140/140/140° C., die head temperature of 140° C., screw speed of 100 revolutions per minute and average residence time of about three minutes. The extrudate melt, upon exiting from the strand die, is cooled in a water bath and pelletized. The product which is cross-linked polyester has an onset $T_g$ of about 54° C. as measured by DSC, melt viscosity of about 40,000 poise at 100° C. and about 150 poise at 160° C. as measured at 10 radians per second, a gel content of about 0.7 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC, is found to have $M_n$ of about 3,900, $M_w$ of about 10,100, $M_w/M_n$ of about 2.59, and onset $T_g$ of 55° C. which is substantially the same as the original noncross-linked resin, which indicates that it contains no sol.

Thereafter, a toner is formulated by melt mixing the above prepared cross-linked unsaturated polyester resin, 92 percent by weight, with 6 percent by weight carbon black and 2 percent by weight alkyl pyridinium halide charge enhancing additive in a Haake batch mixer. The toner is pulverized and classified to form a toner with an average particle diameter of about 9.1 microns and a geometric size distribution (GSD) of about 1.32. The toner is evaluated for fixing, blocking, and vinyl offset performance. Results show that the cold offset temperature is about 110° C., the minimum fix temperature is about 126° C., the hot offset temperature is about 135° C., and the fusing latitude is about 9° C. Also, the toner has excellent blocking performance (about 53° C. as measure by DSC) and shows no apparent vinyl offset.

EXAMPLE II

A cross-linked unsaturated polyester resin is prepared by the reactive extrusion process by melt mixing 98.6 parts of a linear unsaturated polyester with the structure and properties described in Example I, and 1.4 parts benzoyl peroxide initiator as outlined in the following procedure.

The unsaturated polyester resin and benzoyl peroxide initiator are blended in a rotary tumble blender for 30 minutes. The resulting dry mixture is then fed into a Werner & Pfleiderer ZSK-30 twin screw extruder at 10 pounds per hour using a loss-in-weight feeder. The cross-linking is carried out in the extruder using the following process conditions: barrel temperature profile of 70/160/160/160/160/160/160° C., die head temperature of 160° C., screw rotational speed of 100 revolutions per minute and average residence time of about three minutes. The extrudate melt, upon exiting from the strand die, is cooled in a water bath and pelletized. The product which is cross-linked polyester has an onset $T_g$ of about 54° C. as measured by DSC, melt viscosity of about 65,000 poise at 100° C. and about 12,000 poise at 160° C. as measured at 10 radians per second, a gel content of about 50 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC, is found to have $M_n$ of about 3,900, $M_w$ of about 10,100, $M_w/M_n$ of about 2.59, and onset $T_g$ of 55° C. which is substantially the same as the original noncross-linked resin, which indicates that it contains no sol.

Thereafter, a toner is prepared and evaluated according to the same procedure as in Example I except that the average particle diameter is about 9.8 microns and the GSD is about 1.33. Results show that the cold offset temperature is about 110° C., the minimum fix temperature is about 135° C., the hot offset temperature is about 195° C., and the fusing latitude is about 60° C. Also, the toner has excellent blocking performance (about 53° C. as measured by DSC) and shows no apparent vinyl offset.

COMPARATIVE EXAMPLE I

This comparative example shows the effect of changes in gel content on toner fixing performance for cross-linked unsaturated polyester resins. Two resins are compared in this example. Resin A is linear unsaturated polyester with the structure and properties of the linear unsaturated polyester described in Example I. Resin B is partially cross-linked polyester resin prepared by the reactive extrusion process by melt mixing 99.0 parts linear unsaturated polyester (Resin A) and 1.0 part benzoyl peroxide initiator as outlined in the following procedure.

The unsaturated polyester resin (Resin A) and benzoyl peroxide initiator are blended in a rotary tumble blender for 30 minutes. The resulting dry mixture is then fed into a Werner & Pfleiderer ZSK-30 twin screw extruder at 10 pounds per hour using a loss-in-weight feeder. The cross-linking is carried out in the extruder using the following process conditions: barrel temperature profile of 70/160/160/160/160/160/160° C., die head temperature of 160° C., screw rotational speed of 100 revolutions per minute and average residence time of about three minutes. The extrudate melt, upon exiting from the strand die, is cooled in a water bath and pelletized.

Thereafter, Toners A and B are prepared from the resins A and B, and evaluated according to the same procedure as in Example I. The toner of resin A has an average particle diameter of about 9.3 microns and a GSD of about 1.29. The toner of resin B has an average particle diameter of about 10.1 microns and a GSD of about 1.32. Results of fixing tests are shown in Table 1. Results for Toner A produced from Resin A shown a cold offset temperature of about 110° C. and a hot offset temperature of about 120° C. Due to the proximity of COT and HOT, it is not possible to determine the minimum fix temperature, indicating that the fusing latitude is very small. From Table 1, it can be seen that with a toner resin of the invention, the fusing latitude is dramatically higher, while the minimum fix temperature remains virtually unchanged.

TABLE 1

| | Linear Content Wt % | Sol Content Wt % | Gel Content Wt % | COT °C. | MFT °C. | HOT °C. | FL °C. |
|---|---|---|---|---|---|---|---|
| Toner A | 100 | 0 | 0 | 110 | — | 120 | — |
| Toner B | 85 | 0 | 15 | 110 | 129 | 155 | 26 |

COMPARATIVE EXAMPLE II

This comparative example shows the difference between cross-linked polyester resins prepared by a conventional cross-linking method versus the resin prepared according to the present invention. Two additional resins are considered in this example, a linear polyester and a cross-linked polyester prepared by conventional cross-linking.

First, a linear polyester resin, Resin C, is prepared by the following procedure. About 1,645 grams of dimethyl terephthalate, 483 grams of 1,2-propane diol, and 572 grams of 1,3-butane diol are charged to a three liter, four necked resin kettle which is fitted with a thermometer, a stainless steel stirrer, a glass inlet tube and a flux condenser. The flask is supported in an electric heating mantle. Argon gas is allowed to flow through the glass inlet tube thereby sparging the reaction mixture and providing an inert atmosphere in the reaction vessel. The stirrer and heating mantle are activated and the reaction mixture is heated to about 80° C. at which time about 0.96 grams of tetraisopropyl titanate is added to the reaction mixture. The reaction mixture is gradually heated to a temperature of about 170° C. whereupon methanol from the condensation reaction is condensed and is removed as it is formed. As the reaction progresses and more methanol is removed, the reaction temperature is slowly increased to about 200° C. Over this period, about 94 weight percent of the theoretical methanol is removed. At this time, the reactor is cooled to room temperature and the reactor is modified by replacing the reflux condenser with a dry ice-acetone cooled trap with the outlet of the trap connected to a laboratory vacuum pump through an appropriate vacuum system. Heat is reapplied to the reactor with the reactants under argon purge. As the reactants become molten, stirring is started. When the reactants are heated to about 84° C. the vacuum is about 30 microns mercury. The reaction is continued at about these conditions for about seven hours until the reactants become so viscous that considerable difficulty is encountered in removing the volatile reaction by-products from the reactants. At this point, the vacuum is terminated by an argon purge and the reaction product is cooled to room temperature. The resulting polymer is found to have a hydroxyl number of about 48, an acid number of about 0.7, a methyl ester number of about 7.5 and a glass transition temperature of about 56° C. Using vapor pressure osmometry in methyl ethyl ketone, the number average molecular weight of the resulting linear polymer is found to be about 4,100.

Second, a cross-linked polyester resin, Resin D, is prepared by polyesterification by the following procedure. About 1,645 grams of dimethyl terephthalate, 483 grams of 1,2-propane diol, 572 grams of 1,3-butane diol and 15 grams of pentaerythritol as cross-linking agent are charged to a three liter, four necked resin kettle and the polyesterification and cross-linking are carried out under the same conditions as above. The resulting polymer is found to have a hydroxyl number of about 48, an acid number of about 0.7, a methyl ester number of about 7.5 and a glass transition temperature of about 56° C. By dissolution in chloroform and filtration through a 0.22 micron MF millipore filter under air pressure, the polymer is found to contain about 16 weight percent gel. Using vapor pressure osmometry in methyl ethyl ketone, the number average molecular weight of the soluble fraction of the polymer is found to be about 6,100 which is comprised of linear polymer with a number average molecular weight of about 4,200 and sol.

Thereafter, Toners C and D are prepared from the two resins, C and D, and evaluated according to the same procedure as in Example I. Results of fixing tests are shown in Table 2 along with the results for a toner of Resin B (of the present invention). The toner particles of Resin C have an average particle diameter of about 8.7 microns and a GSD of about 1.30, while those of Resin D have an average particle diameter of about 10.5 microns and a GSD of about 1.31. The hot offset temperature increases (32° C.) with increasing degree of cross-linking (sol and gel content is 30%). However, this is also accompanied by an increase in minimum fix temperature resulting in only a small increase in fusing latitude (10° C.). Most of the benefit achieved by cross-linking is lost due to the increase in minimum fix temperature. Also in Table 2 are the results of fusing evaluations for Toner B, a cross-linked unsaturated polyester resin of the present invention (see Comparative Example I for details). With Toner B, the fusing latitude increases dramatically with increasing gel content and without increasing sol content, while the minimum fix temperature remains virtually unchanged.

TABLE 2

| | Linear Content Wt % | Sol Content Wt % | Gel Content Wt % | COT °C. | MFT °C. | HOT °C. | FL °C. |
|---|---|---|---|---|---|---|---|
| Toner C | 100 | 0 | 0 | 110 | — | 120 | — |
| Toner D | 70 | 14 | 16 | 120 | 146 | 156 | 10 |
| Toner B | 85 | 0 | 15 | 110 | 129 | 155 | 26 |

EXAMPLE III

A cross-linked unsaturated polyester resin is prepared by the reactive extrusion process by melt mixing 98.8 parts of a linear unsaturated polyester with the structure described in Example I and having $M_n$ of about 3,600, $M_w$ of about 11,000, $M_w/M_n$ of about 3.06 as measured by GPC, onset $T_g$ of about 55° C. as measured by DSC, and melt viscosity of about 30,600 poise at 100° C. and about 800 poise at 130° C. as measured at 10 radians per second, and 1.2 parts benzoyl peroxide initiator as outlined in the following procedure.

A 50 gram blend of the unsaturated polyester resin and benzoyl peroxide initiator is prepared by blending in a rotary tumble blender for 20 minutes. The resulting dry mixture is then charged into a Haake batch mixer, and the cross-linking is carried out in the mixer using the following process conditions: barrel temperature of 160° C., rotor speed of 100 revolutions per minute, and mixing time of 15 minutes. The product which is cross-linked polyester has an onset $T_g$ of about about 54° C. as measured by DSC, melt viscosity of about 42,000 poise at 100° C. and about 1,200 poise at 160° C. as measured at 10 radians per second, a gel content of about 11 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC and DSC, is found to have $M_n$ of about 3,500, $M_w$ of about 10,700, $M_w/M_n$ of about 3.06, and onset $T_g$ of 55° C., which is substantially the same as the original noncross-linked resin, which indicates that it contains substantially no sol.

Thereafter, a toner is prepared and evaluated according to the same procedure as in Example I except that the average particle diameter is about 9.9 microns and the GSD is about 1.31. Results show that the cold offset temperature is about 110° C., the minimum fix temperature is about 127° C., the hot offset temperature is about 150° C., and the fusing latitude is about 23° C. Also, the toner has excellent blocking performance (about 53° C. as measured by DSC) and shows no apparent vinyl offset.

EXAMPLE IV

A cross-linked unsaturated polyester resin is prepared by the reactive extrusion process by melt mixing 98.7 parts of a linear unsaturated polyester with the structure and properties described in Example III and 1.3 parts t-amyl peroxy 2-ethyl hexanoate initiator as outlined in the following procedure.

49.35 grams unsaturated polyester resin and 0.65 grams t-amyl peroxy 2-ethyl hexanoate liquid initiator are separately charged into a Haake batch mixer, and the cross-linking is carried out in the mixer using the following process conditions: barrel temperature of 140° C., rotor speed of 100 revolutions per minute, and mixing time of 15 minutes. The resulting product which is cross-linked polyester has an onset $T_g$ of about about 54° C. as measured by DSC, melt viscosity of about 51,000 poise at 100° C. and about 3,100 poise at 160° C. as measured at 10 radians per second, a gel content of about 17 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC and DSC, is found to have $M_n$ of about 3,500, $M_w$ of about 10,600, $M_w/M_n$ of about 3.03, and onset $T_g$ of 55° C. which is substantially the same as the original noncross-linked resin, which indicates that it contains substantially no sol.

Thereafter, a toner is prepared and evaluated according to the same procedure as in Example I except that the average particle diameter is about 10.4 microns and the GSD is about 1.32. Results show that the cold offset temperature is about 110° C., the minimum fix temperature is about 130° C., the hot offset temperature is about 160° C., and the fusing latitude is about 30° C. Also, the toner has excellent blocking performance (about 53° C. as measured by DSC) and shows no apparent vinyl offset.

EXAMPLE V

A cross-linked unsaturated polyester resin is prepared by the reactive extrusion process by melt mixing 98.9 parts by weight of a linear unsaturated polyester with the structure and properties described in Example I, and 1.1 parts by weight benzoyl peroxide initiator as outlined in the following procedure.

The unsaturated polyester resin and benzoyl peroxide initiator are blended in a rotary tumble blender for 30 minutes. The resulting dry mixture is then fed into a Werner & Pfleiderer twin screw extruder at 10 pounds per hour using a loss-in-weight feeder. The cross-linking is carried out in the extruder using the following process conditions: barrel temperature profile of 70/140/140/140/140/140/140° C., die head temperature of 140° C., screw rotational speed of 100 revolutions per minute and average residence time of about three minutes. The extrudate melt, upon exiting from the strand die, is cooled in a water bath and pelletized. The resulting product which is cross-linked polyester has an onset $T_g$ of about 54° C. as measured by DSC, melt viscosity of about 45,000 poise at 100° C. and about 1,600 poise at 160° C. as measured at 10 radians per second, a gel content of about 13 weight percent and a mean microgel particle size of about 0.1 microns as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC and DSC, is found to have $M_n$ of about 3,900, $M_w$ of about 10,100, $M_w/M_n$ of about 2.59, and onset $T_g$ of 55° C., which is substantially the same as the original noncross-linked resin, which indicates that it contains substantially no sol.

Thereafter, a toner is prepared and evaluated according to the same procedure as in Example I, except that the average particle diameter is about 9.6 microns and the GSD is about 1.30. Results show that the cold offset temperature is about 110° C., the minimum fix temperature is about 128° C., the hot offset temperature is about 155° C., and the fusing latitude is about 27° C. Also, the toner has excellent blocking performance (about 53° C. as measured by DSC) and shows no apparent vinyl offset.

While the invention has been described with reference to particular preferred embodiments, the invention is not limited to the specific examples given, and other embodiments and modifications can be made by those skilled in the art without departing from the spirit and scope of the invention.

What is claimed is:

1. A low melt toner resin consisting essentially of linear portions and cross-linked portions, and said cross-linked portions consisting essentially of high density cross-linked microgel particles.

2. The toner resin of claim 1, wherein said microgel particles are present in an amount from about 0.001 to about 50 percent by weight of said toner resin.

3. The toner resin of claim 1, wherein said microgel particles are present in an amount from 0.1 to about 40 percent by weight of said toner resin.

4. The toner resin of claim 1, wherein said microgel particles are no more than about 0.1 micron in average volume diameter and are substantially uniformly distributed in said resin.

5. The toner resin of claim 4, wherein said average volume diameter is about 0.005 to about 0.1 micron.

6. The toner resin of claim 1, wherein said microgel particles have no more than a single bridging molecule between cross-linked chains.

7. The toner resin of claim 1, wherein said linear portions comprise linear unsaturated polyester resin.

8. The toner resin of claim 1, wherein a degree of unsaturation in said linear portions is from about 0.1 to about 30 mole percent.

9. The toner resin of claim 8, wherein said degree of unsaturation is from about 5 to about 25 mole percent.

10. The toner resin of claim 1, wherein said linear portions have a number-average molecular weight ($M_n$) as measured by gel permeation chromatography in the range of from about 1000 to about 20,000.

11. The toner resin of claim 1, wherein said linear portions have a weight-average molecular weight ($M_w$) in the range of from about 2000 to about 40,000.

12. The toner resin of claim 1, wherein said linear portions have a molecular weight distribution ($M_w/M_n$) of from about 1.5 to about 6.

13. The toner resin of claim 1, wherein said linear portions have an onset glass transition temperature ($T_g$) as measured by differential scanning calorimetry in the range of from about 50° C. to about 70° C.

14. The toner resin of claim 1, wherein said linear portions have a melt viscosity as measured with a mechanical spectrometer at 10 radians per second from about 5,000 to about 200,000 poise at 100° C., and said melt viscosity drops sharply with increasing temperature to from about 100 to about 5000 poise as temperature rises from 100° C. to 130° C.

15. The toner resin of claim 1, wherein said resin has a minimum fix temperature below 130° C.

16. The toner resin of claim 1, wherein said resin has a minimum fix temperature from about 100° C. to about 160° C.

17. The toner resin of claim 1, wherein said resin has a fusing latitude of more than about 20° C.

18. The toner resin of claim 1, wherein said resin has a fusing latitude of more than about 30° C.

19. The toner resin of claim 1, wherein said resin has a fusing latitude from about 10° C. to about 100° C.

20. The toner resin of claim 1, wherein said toner resin is prepared by a high temperature, high shear reactive melt mixing process.

21. The toner resin of claim 1, wherein said low melt toner resin is an unsaturated polyester resin, wherein said cross-linked portions comprise very high molecular weight gel particles with high density cross-linking, wherein said gel particles are less than about 0.1 micron in diameter and are substantially uniformly distributed in said resin; and wherein said linear portions have a number-average molecular weight ($M_n$) as measured by gel permeation chromatography in a range of from about 1000 to about 20,000, a weight-average molecular weight ($M_w$) of from about 2000 to about 40,000, a molecular weight distribution ($M_w/M_n$) of from about 1.5 to about 6, an onset glass transition temperature as measured by differential scanning calorimetry in the range of from about 50° to about 70° C., and a melt viscosity as measured with a mechanical spectrometer at 10 radians per second from about 5,000 to about 200,000 poise at 100° C. and said melt viscosity drops sharply with increasing temperature to from about 100 to about 5000 poise as temperature rises from 100° C. to 130° C.

22. The toner resin of claim 21, wherein said toner resin comprises from about 0.001 to about 50 percent by weight of said cross-linked portion, said toner resin comprises from about 50 to about 99.999 percent by weight of said linear portion, and said toner resin has an onset glass transition temperature from about 50° C. to about 70° C., and a melt viscosity at 10 radians per second from about 5,000 to about 200,000 poise at 100° C. and from about 10 to about 20,000 poise at 160° C.

23. The toner resin of claim 22, wherein said toner resin provides a minimum fix temperature of toner of from about 100° C. to about 160° C., a hot offset temperature of toner of from about 110° C. to about 220° C. and substantially no vinyl offset.

24. The toner resin of claim 7, wherein said linear unsaturated polyester resin is poly(propoxylated bisphenol A fumarates).

25. The toner resin of claim 1, which is free of sol.

26. A low melt toner resin produced by a reactive melt mixing process comprising the steps of:

(a) melting a reactive base resin, thereby forming a polymer melt; and (b) cross-linking said polymer melt under high shear and high temperature to form a cross-linked toner resin.

27. The toner resin consisting essentially of linear portions and crosslinked portions, and said crosslinked portions consisting essentially of high density crosslinked microgel particles; said resin of claim 26, wherein said reactive base resin is a linear unsaturated polyester resin.

28. The toner resin of claim 26, wherein said process further comprises the step of mixing a chemical initiator into said polymer melt at a temperature lower than an onset of cross-linking temperature, thereby producing good dispersion of the chemical initiator in said polymer melt prior to onset of cross-linking of said polymer melt.

29. The toner resin of claim 28, wherein a weight fraction of said chemical initiator in said base resin is less than 10 weight percent.

30. The toner resin of claim 26, wherein said cross-linked toner resin is combined with at least one member selected from the group consisting of a colorant, a charge control additive, a surfactant, and a pigment dispersant to form a mixture, and said mixture is further melt blended to form a toner.

31. The toner resin of claim 26, wherein substantially all cross-linking is carried out under high shear.

* * * * *